Patented Dec. 22, 1953

2,663,739

UNITED STATES PATENT OFFICE 2,663,739

SUBSTITUTED PHOSPHACYCLOPENTANE OXIDES AND PROCESS OF PREPARING THEM

William B. McCormack, Wilmington, Del., assignor to E. I. du Pont de Nemours & Company, Wilmington, Del., a corporation of Delaware No Drawing. Application August 7, 1951,
Serial No. 240,810

12 Claims. (Cl. 260—607)

This invention relates to organic phosphorus compounds and particularly to a new class of phosphacyclopentane oxides.

It has been found that certain phosphorus oxides in which the phosphorus is a member of a heterocyclic ring are highly useful as insecticides. It is an object of this invention to provide a new class of substituted phosphacyclopentane oxides having insecticidal activity. A further object is to provide a process for the preparation of these compounds.

In copending application Serial No. 240,808 there is disclosed a new class of substituted phosphacyclopentene oxides which are prepared by the reaction between the corresponding phosphacyclopentene dihalides and water or other compound containing hydroxyl groups. The phosphacyclopentene dihalides are prepared by reacting a conjugated diene such as butadiene with a dihalophosphine, according to a process disclosed in copending application Serial No. 240,807.

According to the present invention, substituted phosphacyclopentane oxides are prepared by the catalytic hydrogenation of the corresponding phosphacyclopentene oxides. This reaction may be formulated as follows:

$$\begin{array}{c} f-C=\!\!=\!\!C-g \\ | \quad\quad | \\ e-CH \quad HC-h \\ \diagdown P \diagup \\ R \quad O \end{array} + H_2 \longrightarrow \begin{array}{c} b-CH-HC-c \\ | \quad\quad | \\ a-CH \quad HC-d \\ \diagdown P \diagup \\ R \quad O \end{array}$$

In these formulae, the symbols $a$, $b$, $c$, $d$, $e$, $f$, $g$ and $h$ represent hydrogen or hydrocarbon radicals and R represents a hydrocarbon or substituted hydrocarbon radical.

The substituents $a$, $b$, $c$ and $d$ may consist of hydrogen or one or more of them may be an alkyl group such as methyl, ethyl, propyl, or isohexyl; an aryl group such as phenyl or alpha- or beta-naphthyl; an alkaryl group such as o- or p-ethylphenyl, p-tolyl or p-xylyl; or an aralkyl group such as benzyl or phenylethyl. Adjacent substituents such as $a$ and $b$, $b$ and $c$, or $c$ and $d$ may together represent a divalent polymethylene radical so as to form a cycloaliphatic ring which shares with the heterocyclic ring two adjacent carbon atoms. An example of one such compound is dodecahydro-9-phenyl-9-phosphafluorene-P-oxide, having the formula:

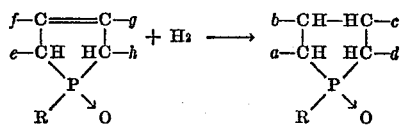

The substituents $e$, $f$, $g$ and $h$ may be the same as the corresponding substituents $a$, $b$, $c$ and $d$ or they may be alkenyl groups such as vinyl, allyl or 4-methyl-3-pentenyl. In such a case the alkenyl radical is converted to the corresponding alkyl radical during the hydrogenation, if the conditions are sufficiently vigorous.

Although the hydrogenation reaction appears to be entirely general for compounds of the class described, it is difficult to prepare the starting materials when excessively large substituents are present in the original conjugated diene from which the heterocyclic phosphine ring is formed. All substituted butadienes in which the total number of aliphatic carbon atoms in the substituents is no more than 6 and in which no more than 3 aromatic rings are present may be used successfully in this reaction. Accordingly, the preferred members of the class of phosphacyclopentane oxides with which the present invention is concerned are those in which the substituents contain no more than a total of 6 aliphatic carbon atoms and no more than 3 aromatic rings.

The substituent R may represent an alkyl, aryl, alkaryl or aralkyl group, including the same specific representatives of these classes which are described above as suitable for the substituents $a$, $b$, $c$, etc. R may also represent an alkoxyaryl group such as o- or p-methoxyphenyl, o- or p-ethoxyphenyl, or o- or p-methoxynaphthyl. In general the lower members of these classes of radicals are most useful.

The hydrogenation reaction is carried out in the presence of a hydrogenation catalyst such as nickel, platinum or palladium or their oxides. Raney nickel is a particularly effective catalyst. The reaction proceeds smoothly over a wide range of temperature and may be conducted at temperatures between 0° and several hundred degrees centigrade. The hydrogenation may be carried out at atmospheric pressure, or if a somewhat faster reaction rate is desired, superatmospheric pressure may be used. Depending on the temperature and pressure and the particular compound involved, the reaction goes to completion within a time range from a few minutes up to as long as several days. Even under the most drastic hydrogenation conditions, the phosphorus-oxygen bond is not affected.

The process of this invention is illustrated by the following examples:

Example 1

To a solution of 100 g. of 1-phenyl-1-phospha-3-cyclo-pentene-P-oxide in 50 cc. of methanol is added about 10 g. of Raney nickel catalyst and the mixture is treated with hydrogen in a Parr shaker system at room temperature and at a pressure of 30–50 p. s. i. Additional hydrogen is introduced intermittently as needed until no more is absorbed, which requires about two hours. The over-all absorption of hydrogen is 97.3% of the theoretical amount. The mixture is filtered, concentrated and distilled to give 98 g. of clear water-white product boiling at 136–137° C. (0.3 mm.). This represents a 96.5% yield of 1-phenyl-1-phosphacyclopentane-P-oxide.

In a similar manner the same olefin is reduced in the presence of platinum oxide (Adams catalyst) at a rate comparable to that with nickel.

In the same way, the reduction takes place with palladium instead of Raney nickel, the absorption of hydrogen being considerably slower.

Example 2

Using the procedure of Example 1, 50 g. (0.24 m.) of 1 - phenyl - 3,4 - dimethyl-1-phospha-3-cyclopentene-P-oxide in 100 cc. of methanol are reduced at room temperature with hydrogen in the presence of 10 g. of Raney nickel. The corresponding saturated material, 1-phenyl-3,4-dimethyl-1-phosphacyclopentane-P-oxide, is obtained in 95.5% yield. The product boils at 160–168° C. (0.7 mm.).

Example 3

One hundred grams (0.384 m.) of 1-phenyl-3(4' - methyl - 3' - pentenyl) - 1 - phospha - 3 - cyclopentene-P-oxide are hydrogenated in 100 cc. of methanol in the presence of about 15 g. of Raney nickel at 50°. After about half the theoretical amount of hydrogen is absorbed, the rate of absorption of hydrogen becomes very slow. The nickel is replaced by 5 g. of platinum oxide, and hydrogenation is resumed at room temperature. The over-all hydrogen consumption is theoretical for saturation of both double bonds, approximately 55% of this hydrogen being absorbed in the presence of the nickel. Filtration and distillation give a 93.4% yield of clear water-white product boiling at 190–191° C. (0.5 mm.), $n_D^{24.0}=1.5282$.

*Analysis.*—Calcd. for $C_{16}H_{25}OP$: C=72.66%; H=9.54%; P=11.73%. Found: C=72.0%; H=9.5%; P=11.9%.

Example 4

By the procedure of Example 1, 41.6 g. (0.187m.) of 1 - (p - methoxyphenyl) - 3 - methyl - 1 - phospha-3-cyclopentene-P-oxide is hydrogenated in methanol in the presence of Raney nickel at room temperature, with the theoretical absorption of hydrogen. Distillation gives a 96.9% yield of product boiling at 178–185° C. (0.3 mm.).

*Analysis.*—Calcd. for $C_{12}H_{17}O_2P$: P=13.82%. Found: P=13.9%.

Example 5

Using the procedure described in Example 4, 1 - (p - ethylphenyl) - 3 - methyl - 1 - phospha-3-cyclopentene-P-oxide is hydrogenated to give the corresponding saturated material in 96.5% yield. The product boils at 150–152° C. (0.4 mm.), $n_D^{25}=1.5473$.

*Analysis.*—Calcd. for $C_{13}H_{19}OP$: C=70.25%; H=8.62%; P=13.92%. Found: C=70.6%; H=8.7%; P=13.9%.

Example 6

A mixture of 13.7 g. (.095 m.) of 1-ethyl-3-methyl - 1 - phospha - 3 - cyclopentene - P - oxide and 0.5 g. of platinum oxide is shaken in an atmosphere of hydrogen at room temperature in a Parr shaker system. The theoretical amount of hydrogen is absorbed in thirty minutes. There is obtained by filtration and distillation a 93.2% yield of the saturated product as a colorless liquid boiling at 95–100° C. (0.6 mm.).

Example 7

A solution of 1-phenyl-2,3; 4,5-di(tetramethylene) - 1-phospha-3-cyclopentene-P-oxide in methanol is hydrogenated in the presence of Raney nickel, using the conditions described in Example 1. The corresponding dihydro compound is obtained.

The new substituted phosphacyclopentane oxides of this invention are high boiling, colorless liquids and white crystalline solids. They are extremely inert, both chemically and thermally. They withstand temperatures up to at least 300° C. without decomposition. The oxygen of the phosphine oxide may be replaced by halogen by treatment with strong halogenating agents such as phosphorus pentachloride or chlorine, but is not affected by most other reagents. The phosphacyclopentane oxides are very stable with respect to oxidation or to treatment with bases. These compounds have insecticidal activity against aphids and two-spotted mites and are also useful as heat-transfer media.

I claim:

1. A substituted phosphacyclopentane oxide having the formula

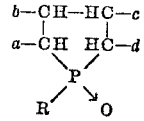

in which a, b, c and d represent members of the class consisting of hydrogen, alkyl, aryl, alkaryl and aralkyl groups and divalent tetramethylene groups which together with two adjacent carbon atoms in the heterocyclic ring form a cycloaliphatic ring, no more than a total of 6 aliphatic carbon atoms and no more than 3 aromatic rings being present, and in which R represents a member of the group consisting of alkyl, aryl, alkaryl, aralkyl and alkoxyaryl radicals.

2. 1 - phenyl - 1 - phosphacyclopentane - P - oxide having the formula:

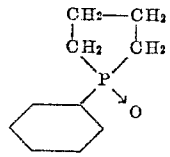

3. 1 - ethyl - 3 - methyl - 1 - phosphacyclopentane-P-oxide having the formula:

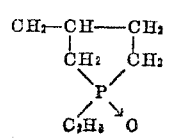

4. 1 - phenyl - 3 - methyl - 1 - phosphacyclopentane-P-oxide having the formula:

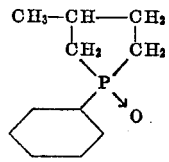

5. 1 - phenyl - 3,4 - dimethyl - 1 - phosphacyclopentane-P-oxide having the formula:

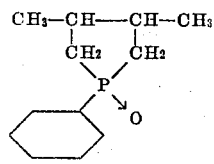

6. A process for preparing a substituted phosphacyclopentane oxide having the formula

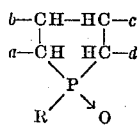

in which $a$, $b$, $c$ and $d$ represent members of the class consisting of hydrogen, alkyl, aryl, alkaryl and aralkyl groups and divalent tetramethylene groups which together with two adjacent carbon atoms in the heterocyclic ring form a cycloaliphatic ring, no more than a total of 6 aliphatic carbon atoms and no more than 3 aromatic rings being present, and in which R represents a member of the group consistsing of alkyl, aryl, alkaryl, aralkyl and alkoxyaryl radicals which comprises hydrogenating in the presence of a hydrogenation catalyst a substituted phosphacyclopentene oxide having the formula

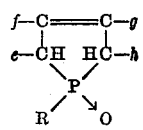

in which $e$, $f$, $g$ and $h$ represent members of the class consisting of hydrogen, alkyl, alkenyl, aryl, alkaryl and aralkyl groups and tetramethylene groups which together with two adjacent carbon atoms in the heterocyclic ring form a cycloaliphatic ring, no more than a total of 6 carbon atoms being present in aliphatic substituents and no more than 3 aromatic rings being present, and in which R has the significance described above.

7. A process for preparing 1-phenyl-1-phosphacyclopentane-P-oxide having the formula:

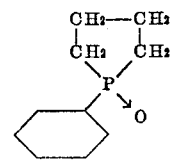

which comprises hydrogenating in the presence of a hydrogenation catalyst 1-phenyl-1-phospha-3-cyclopentene-P-oxide having the formula:

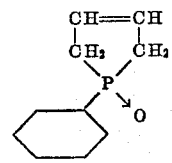

8. A process for preparing 1-ethyl-3-methyl-1-phosphacyclopentane-P-oxide having the formula:

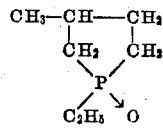

which comprises hydrogenating in the presence of a hydrogenation catalyst 1-ethyl-3-methyl-1-phospha-3-cyclopentene-P-oxide having the formula:

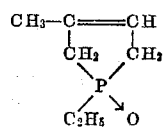

9. A process for preparing 1-phenyl-3-methyl-1-phosphacyclopentane-P-oxide having the formula:

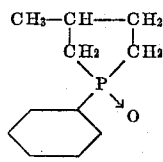

which comprises hydrogenating in the presence of a hydrogenation catalyst 1-phenyl-3-methyl-1-phospha-3-cyclopentene-P-oxide having the formula:

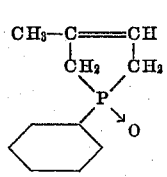

10. A process for preparing 1-phenyl-3,4-dimethyl-1-phosphacyclopentane-P-oxide having the formula:

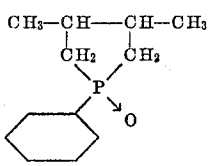

which comprises hydrogenating in the presence of a hydrogenation catalyst 1-phenyl-3,4-dimethyl-1-phospha-3-cyclopentene-P-oxide having the formula:

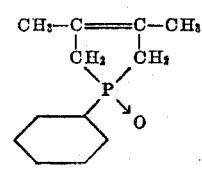

11. A process for preparing 1-phenyl-3-isohexyl-1-phosphacyclopentane-P-oxide having the formula:

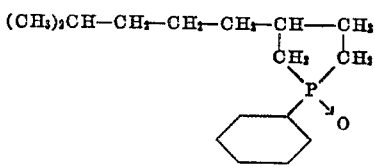

which comprises hydrogenating in the presence of a hydrogenation catalyst 1-phenyl-3(4'-methyl - 3' - pentenyl) 1 - phospha - 3 - cyclopentene-P-oxide having the formula:

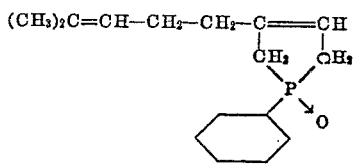

12. 1 - phenyl - 3 - isohexyl - 1 - phosphacyclopentane-P-oxide having the formula:

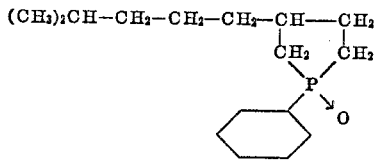

WILLIAM B. McCORMACK.

References Cited in the file of this patent
UNITED STATES PATENTS

| Number | Name | Date |
|---|---|---|
| 2,160,915 | Schreiber | June 6, 1939 |

Certificate of Correction

Patent No. 2,663,739                                              December 22, 1953

William B. McCormack

It is hereby certified that error appears in the printed specification of the above numbered patent requiring correction as follows:

Column 4, line 71, claim 3, for that portion of the formula reading "$CH_2-CH-CH_2$" read $CH_3-CH-CH_2$;

and that the said Letters Patent should be read as corrected above, so that the same may conform to the record of the case in the Patent Office.

Signed and sealed this 9th day of February, A. D. 1954.

[SEAL]

ARTHUR W. CROCKER,
*Assistant Commissioner of Patents.*